April 17, 1962 R. W. CARLSON 3,030,509
STANDARDIZED LUMINOPHORE
Filed Sept. 4, 1959 3 Sheets-Sheet 3
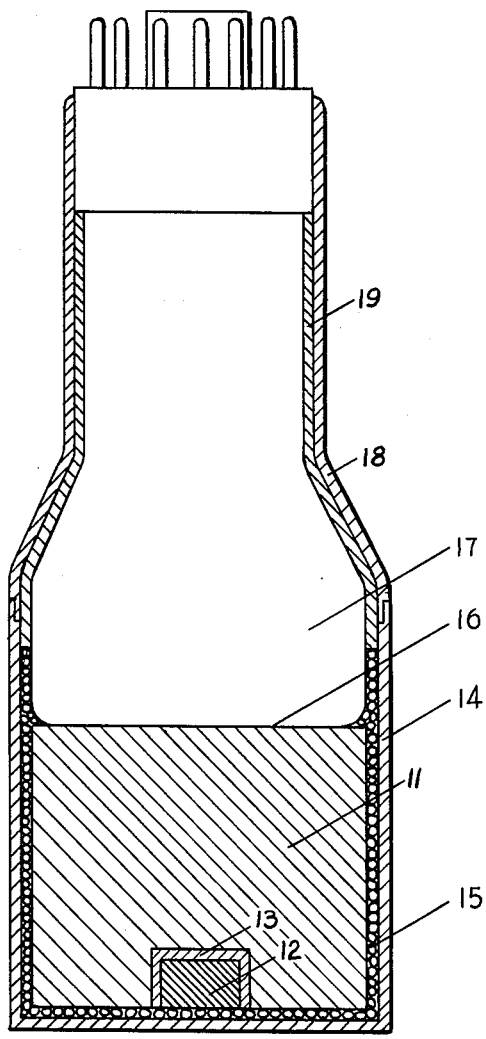
FIG. III
ROLAND W. CARLSON, INVENTOR.
BY
William H Brown

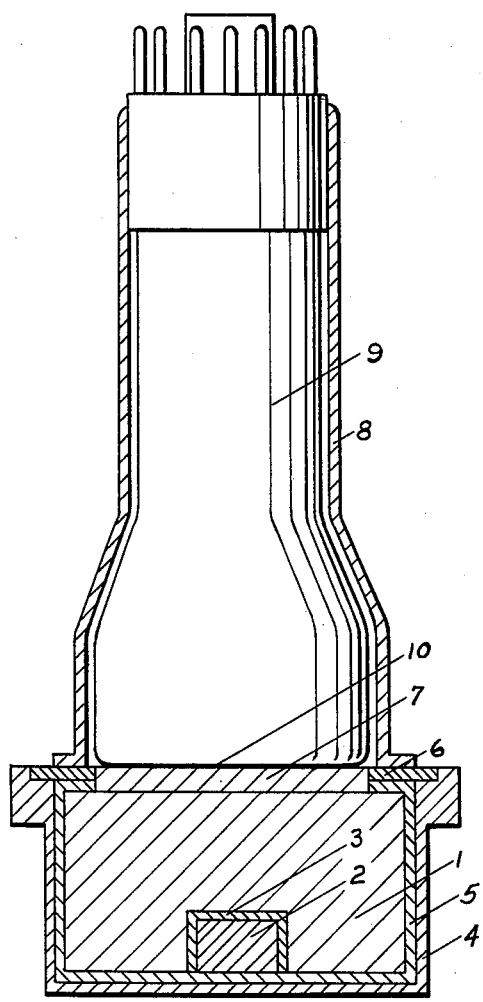
FIG. I
ROLAND W. CARLSON, INVENTOR.
BY William H Brown

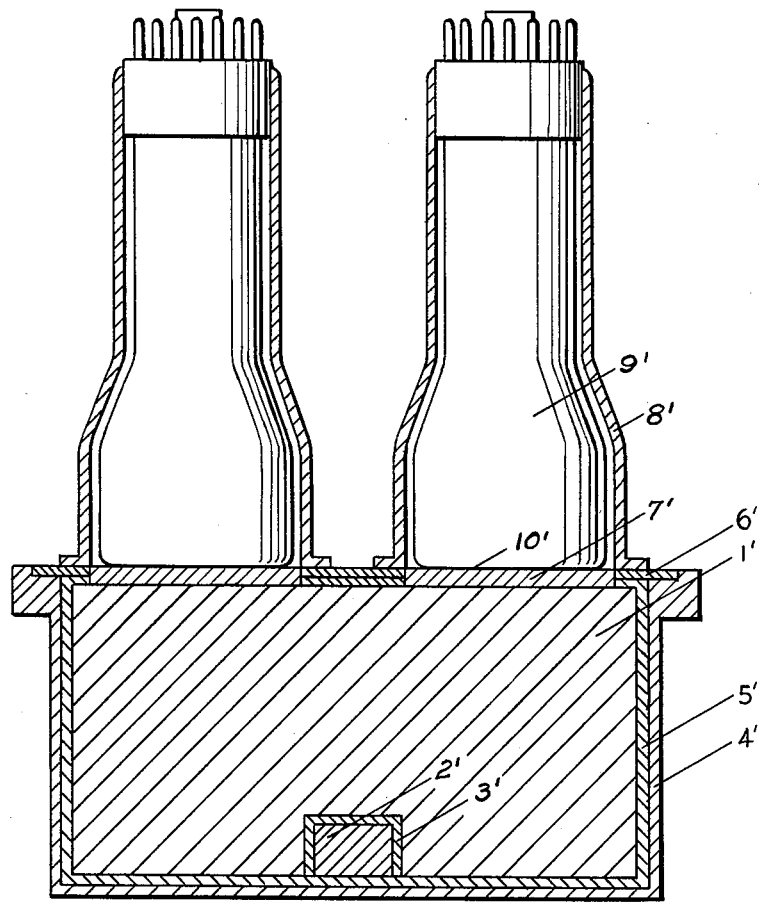
FIG. II
ROLAND W. CARLSON, INVENTOR.
BY William H Brown

United States Patent Office 3,030,509
Patented Apr. 17, 1962

3,030,509
STANDARDIZED LUMINOPHORE
Roland W. Carlson, East Cleveland, Ohio, assignor to The Harshaw Chemical Company, Cleveland, Ohio, a corporation of Ohio
Filed Sept. 4, 1959, Ser. No. 838,163
8 Claims. (Cl. 250—71.5)

This invention relates to a luminophore which is so constructed as to serve as a standard in nuclear radiation energy measuring devices.

Luminophores are devices which have the ability to convert energy of nuclear radiation into light energy. The term "luminophore" as used herein includes organic and inorganic crystals which have the ability to convert nuclear radiation energy into light energy and also includes organic and inorganic materials having the ability to convert nuclear radiation energy into light energy which are dispersed in suitable organic polymeric resinous binders.

Luminophores are suitably coupled to photomultiplier tube mechanisms to form nuclear radiation energy measuring devices known as scintillation meters. In the operation of a scintillation meter, radioactive emanations from a source of radiation strike the luminophore causing flashes of light to occur. The flashes of light or scintillations are directed to the photomultiplier tube where they are converted into an electric current at the photo cathode and then amplified by a system of secondary emitting electrodes within the tube. The current output from the photomultiplier tube is sent to electronic devices which may process and display the information contained in the output current.

Measurements which are commonly obtained from the output current of the scintillation meter system are frequency and amplitude. Frequency or count rate is a rate measurement of the number of scintillations occurring per second. Amplitude or pulse height is a measure of magnitude of individual scintillations, which is in some cases indicative of the energy of the nuclear radiation. A figure of merit for the performance of the system is resolution. Resolution is the ratio of the half maximum of the amplitude distribution curve for total energy absorption scintillation pulses to the average amplitude of such pulses.

The measurements obtained by scintillation meters, however, are subject to certain variables which necessitates the use of a calibrating standard. It has been found that measurements obtained by scintillation meters may vary due to electronic failures such as phototube fatigue and fluctuating or drifting power supply.

The prior art has disclosed various systems for furnishing calibrating standards for scintillation meters. The calibrating standards of the prior art are: (1) the flashing light and (2) externally disposed elemental radioactive materials. A system of radioactive materials uniformly dispersed throughout the primary luminophore may also be employed as a calibrating standard. This system, however, is not to be considered as part of the present invention.

The calibrating standards of the prior art have not been found to be entirely satisfactory. An attempt has been made to calibrate scintillation meters by disposing an electric incandescent flashing light or gaseous discharge light source adjacent to the photomultiplier tube. This system has been found to be impractical in that it is necessary that each light flash be of the same intensity as the others and also in that it is necessary that the system be encumbered by an energy source such as batteries to activate the flashing light.

An externally disposed elemental radioactive source has also been found to have limitations. Such systems place a quantity of elemental alpha particle emitting radioactive material adjacent to the luminophore at a point directly opposite the luminophore-photomultiplier tube coupling or the window which is interposed between the luminophore and the photomultiplier tube. The observed pulses from the externally disposed radioactive material have been found to vary, the variation being due to the fact that there is a variable energy loss in the alpha particle in the process of entering the luminophore, such energy loss resulting in a spread of the observed resolution.

The third type calibrating standard is the distribution of alpha particle emitting radioactive materials throughout the luminophore. This practice, however, does not yield the best resolution because of the variations in light collection efficiency throughout the volume of the luminophore. This means that although the generation of scintillation light is constant throughout the volume, the amount of light reaching the phototube will vary according to where the scintillation event occurred. This variation will result in an unwanted spread in observed resolution. In addition to the optical disadvantages of a complete dispersion of radioactive material throughout the luminophore, there is also the disadvantage of producing an entire radioactive luminophore ingot from which only a small segment may be employed to satisfy the requirements for a single luminophore of preselected size and count rate.

I have now discovered a new means for producing a standardized luminophore. The standardized luminophore of this invention consists of reference luminophore having alpha particle emitting radioactive material dispersed therein and said reference luminophore being coupled with a primary luminophore. In other words, the present invention, in order to obtain a standardized luminophore, neither distributes a radioactive source throughout the luminophore nor merely places an elemental source of radioactive material adjacent to the luminophore, but provides quite a different system wherein the radioactive source is dispersed in one luminophore body, whereby to generate light flashes therein and such luminophore body is coupled to the principal or primary luminophore body. The light flashes produced in the luminophore body containing the radioactive material pass through the primary luminophore body to the photo cathode of the photomultiplier tube. The standardized luminophore of this invention is an absolute standard with regard to frequency and a determinable standard with regard to amplitude and resolution, the determining factor being the operating temperature. The frequency is a constant because the rate of decay of alpha particle emanations is known and the amount of radioactive material is fixed. The amplitude and resolution will vary to a small degree due to temperature induced changes in the ability of the luminophore to convert nuclear radiation energy into light energy. However, for any known temperature within the functional limits of the photomultiplier tube and the luminophore, the amplitude and the resolution may be considered a constant.

It is, therefore, an object of this invention to produce improved standardized luminophores.

It is another object of this invention to produce a self sustained standardized luminophore having a small resolution spread.

It is a further object of this invention to couple a reference luminophore containing alpha particle emitting radioactive materials with a primary luminophore.

It is still another object of this invention to produce scintillation meter components containing improved standardized luminophores.

The "reference luminophore" is the luminophore having an alpha particle emitting radioactive material disposed therein. The alpha particle emitting radioactive material suitable for purposes of this invention is any alpha particle emitting radioactive material having a half life from about one year to infinity. Examples of suitable alpha particle emitting radioactive materials are $Pu^{239}$, $Ac^{227}$, $Ra^{226}$, $Th^{230}$ and $Pb^{210}$, the preferred radioactive material being $Pb^{210}$. The "reference luminophore" itself may be an organic or inorganic crystalline luminophore or a plastic phosphor. The preferred reference luminophore is a thallium activated sodium iodide scintillation crystal. The means by which the radioactive material is added to the reference luminophore is unimportant for the purposes of this invention as long as the radioactive material is dispersed throughout the reference luminophore.

The "primary luminophore" of this invention may be an organic or inorganic crystal luminophore or a plastic phosphor. The primary luminophore and the reference luminophore may be the same materials or may be different materials, it being understood, of course, that the reference luminophore and the primary luminophore always do differ in that the reference luminophore contains the radioactive material and the primary luminophore does not.

The reference luminophore is cut from a large mass of preformed material such as, for instance, a crystal ingot and optically coupled with a primary luminophore. The reference luminophore may be cut to a size which will give a preselected frequency or count rate of alpha particle emanations. The subsequent juncture of the reference luminophore and the primary luminophore makes possible a standardized luminophore of preselected count rate and size. It has been found that the most suitable position for the disposition of the reference luminophore is in a cavity preferably on that face of the primary luminophore which is directly opposite the face to be coupled with the photomultiplier tube. The disposition of the reference luminophore at this point is preferred for the reason that such a disposition will result in the scintillations emitting from the reference luminophore being more evenly distributed over the entire surface area of the photo cathode of the photomultiplier tube.

The reference luminophore is optically coupled with the primary luminophore and the primary luminophore is radioactively shielded from the alpha particles of the reference luminophore by means of a suitable transparent coupling composition having the necessary shielding properties as, for example, an epoxy resin, or a silicone composition such as, for instance, Dow-Corning Silicone Grease QC-2-0057, or Dow-Corning Dielectric Gel XF 1-0042. All of the silicone compounds suitable for the purposes of this invention must have good thermal stability and must have sufficient flexibility to maintain a firm optical coupling even though the luminophore is expanding or contracting due to temperature changes. The term "epoxy" resin" as employed in this application includes any optically clear epoxy resin suitable for laminating purposes. The preferred epoxy resin is marketed by the Shell Chemical Corporation under the trademark Epon 815. Epon 815 has been found to provide a coupling between the two luminophores which is sufficiently rigid to be maintained without additional support, yet flexible enough to compensate for expansion of the luminophore. The epoxy resin coupling for a reference luminophore employing $Pb^{210}$ as an alpha particle emitting radioactive material is of a thickness greater than about $5/1000''$. The thickness of $5/1000''$ has been selected so that the alpha particle emanations issuing from the reference luminophore will be completely shielded against entry into the primary luminophore. Alpha particles are known to have a certain maximum range which is dependent upon the energy of the alpha particles and upon the medium within which the alpha particle travels. Using the Bragg Kleeman rule for determining the range of an alpha particle emitting from $Pb^{210}$ it was found that the maximum distances which such a particle could travel through an epoxy resin material was $1.8 \times 10^{-3}$ inch. It should be noted that this figure is a valuation for $Pb^{210}$ alone, the measurements derived from the Bragg Kleeman rule being dependent on the type of alpha particle emitting radioactive material. As the Bragg Kleeman rule, which is accurate within $\pm 15\%$, a safety factor was allowed by increasing the thickness of the epoxy resin employed to $5/1000''$. The maximum thickness of the epoxy resin is limited, of course, by the epoxy resin's characteristic of inhibiting the transmission of light when employed in great thicknesses.

The Epon resins and especially Epon 815 are eminently suited for the optical coupling between the primary luminophore and the reference luminophore and also provide an excellent mechanical coupling and shield against transmission of alpha particles into the primary luminophore but other resins also can be used. The essential requirements are transparency, a sufficient degree of plasticity to compensate for the high coefficient of expansion of certain luminophores, ability to wet the luminophore, and the ability of a relatively thin film to stop alpha particles.

The primary luminophore having a reference luminophore optically and mechanically coupled therewith is suitably enclosed is a metal housing such as an aluminum housing having a glass window on one end and having a reflective coating material disposed between the luminophore and the walls of the housing. The reflective coating is preferably a packed oxide coating or a vapor deposited oxide coating selected from the group consisting of magnesium oxide and aluminum oxide. The housing members may also be variations of this basic type of enclosure such as, for instance, those housings which are adaptable for mounting multiple groups of photomultiplier tubes and those housings which enclose a photomultiplier tube and a luminophore in a unitary structure.

The various incidental advantages which are the result of the novel standardized luminophore will be apparent from the following detailed description of one means for realizing the present invention:

FIGURE I is a sectional side view, which is not to scale, of the standardized luminophore of this invention coupled ot a photomultiplier tube.

FIGURE II is a sectional side-view, which is not to scale, of the standardized luminophore of this invention coupled to a plurality of photo-multiplier tubes.

FIGURE III is a sectional side-view, which is not to scale, of the standardized luminophore of this invention coupled to a photomultiplier tube in a unitary structure.

In FIGURE I the reference luminophore 2 is coupled to a primary luminophore 1 by means of an epoxy resin coating 3. The coupled luminophores are enclosed by a flanged housing structure 4, said flanged housing structure 4 having a suitable reflective coating material 5 disposed between its inner walls and the outside edge of the luminophores 1 and 2. A glass window 7 is optically coupled to the luminophore 1 and sealed in place by means of a juncture with retaining member 6, which is coupled to the flanged housing structure 4. The photomultiplier tube 9 is coupled with the glass window 7 by means of an optical coupling 10. The photomultiplier tube 9 is retained in place by means of a photomultiplier tube enclosure 8 which is joined with the retaining member 6.

In operation the source of radioactive material contained with in the reference luminophore 2 emits alpha particles of a distinct energy. As the alpha particles lose their energy to the luminophore, they give rise to light pulses or scintillations of a distinct intensity. These light pulses are transmitted through the epoxy resin 3 and through the primary luminophore 2, glass window 7 and optical coupling 10 to the photomultiplier tube 9, at which point the scintillations are converted to electrical pulses of a distinct magnitude. In the event that the scintillations emanating from the reference luminophore 2 are at an angle out of line with the photomultiplier tube 9, they will be reflected by the reflective coating material 5 so that after following a devious path they will eventually present themselves to the photomultiplier tube. Because the volume in which these calibrating scintillations occur is small compared to the light collection volume of the primary luminophore, the aforementioned variations in light collection will be negligible.

In FIGURE II the reference luminophore 2' is coupled to a primary luminophore 1' by means of an epoxy resin coating 3.

The coupled luminophores 1' and 2' are enclosed by a flanged housing structure 4', said flanged housing structure 4' having a suitable reflective coating 5' disposed between its inner walls and the outside edge of the luminophores 1' and 2'. Glass windows 7' are coupled to the luminophore 1' and sealed in place by means of a retaining member 6', which is coupled to the flanged housing structure 4'. Photomultiplier tubes 9' are coupled with the glass windows 7' by means of optical couplings 10'. The photomultiplier tubes 9' are retained in place by means of photomultiplier tube enclosure 8', which are joined with the retaining member 6'.

In operation the standardized luminophore of FIGURE II functions much the same as the luminophore of FIGURE I with the exception that light pulses emanating from both luminophore 1' and luminophore 2' are converted into electrical pulses in any one of the plurality of photomultiplier tubes.

In FIGURE III reference luminophore 12 is coupled to a primary luminophore 11 by means of an epoxy resin coating 13. The coupled luminophores are enclosed in a housing structure 14, said housing structure 14 having a suitable reflective coating material 15 disposed on its inner walls. A photomultiplier tube 17 is optically coupled with the primary luminophore 1 by means of an optical coating 16. The reflective coating material 15 extends from the outside edge of luminophore 11 and 12 and up the walls of the photomultiplier tube 17 to a point well beyond the photo cathode of the photomultiplier tube. The photomultiplier tube 17 is mechanically coupled with the primary luminophore 11 by means of a housing member 18 which is joined to housing member 14. A coating of potting composition 19 is disposed between the photomultiplier tube 17 and the housing member 18.

In operation of the standardized luminophore of FIGURE III, the source of radioactive material contained within the luminophore 12 emits alpha particles of a distinct energy. As the alpha particles lose their energy to the luminophore, they give rise to light pulses or scintillations of a distinct intensity. These light pulses are transmitted through the epoxy resin 13 and through the primary luminophore 11 and optical coating 16 to the photomultiplier tube 17, at which point scintillations are converted into electrical pulses of a distinct magnitude. In the event that scintillations emanating from the reference luminophore 12 are at an angle out of line with the photomultiplier tube 17, they will be reflected by the reflective coating material 15 so that after following a devious path they will eventually present themselves to the photomultiplier tube. It should be noted that scintillations which must be reflected in order to reach the photomultiplier tube 17 may be reflected by an extension of the reflective coating material 15 which extends along the walls of the photomultiplier tube 17. The extended reflective coating 15 has the advantage of not only directing light pulses to the photo cathode of the photomultiplier tube 17 but also of redirecting that light which is not converted by the photo cathode on its initial contact. Radioactive emanations other than alpha particles from a source of radioactivity will pass through the housing component 14, reflective coating material 15 to either luminophores 11 or 12, where they will be converted in varying degrees to light pulses or scintillations. These scintillations will then be converted into electrical energy in the same manner as the reference luminophore scintillations were converted.

What I claim is:

1. A packaged standardized luminophore comprising a primary luminophore having a cavity therein, a reference luminophore having an alpha particle emitting radioactive material dispersed therein, said reference luminophore being secured within said cavity by means of a continuous epoxy resin coupling material, and a metal housing member having a glass window on one face thereof and a reflective coating on all interior metal surfaces, said coupled primary luminophore and reference luminophore being disposed within said housing in a manner such that said reference luminophore is positioned at a point opposite said glass window.

2. The packaged standardized luminophore of claim 1 wherein the reference luminophore and the primary luminophore are scintillation crystals and wherein the alpha particle emitting material is $Pb^{210}$.

3. The packaged standardized luminophore of claim 1 wherein the reference luminophore and the primary luminophore are organic phosphors and wherein the alpha particle emitting material is $Pb^{210}$.

4. A scintillation meter component comprising a standardized luminophore consisting of a primary luminophore having a cavity therein, a reference luminophore having an alpha particle emitting radioactive material dispersed therein, said reference luminophore being secured within said cavity by means of a continuous epoxy resin coupling material and a photomultiplier tube, said photomultiplier tube being optically coupled to said primary luminophore at a point opposite said reference luminophore.

5. The scintillation meter component of claim 4 wherein said standardized luminophore has a reflective coating covering all areas not in contact with said photomultiplier tube.

6. A scintillation meter component comprising a standardized luminophore consisting of a primary luminophore having a cavity therein, a reference luminophore having an alpha particle emitting radioactive material dispersed therein, said reference luminophore being secured within said cavity by means of a continuous epoxy resin coupling material and a plurality of photomultiplier tubes, said photomultiplier tubes being optically coupled to a face of said primary luminophore at a point opposite said reference luminophore.

7. A standardized luminophore comprising a first luminophore having a second luminophore optically coupled thereto by means of a light transparent organic material of a thickness sufficient to stop alpha particles, said second luminophore having dispersed therein a source of alpha particle emitting radioactive material.

8. A standardized luminophore comprising a first luminophore having a cavity therein and a second luminophore optically coupled to said first luminophore within said cavity by means of a light transparent organic material of a thickness sufficient to stop alpha particles, said second luminophore having dispersed therein a source of alpha particle emitting radioactive material.

References Cited in the file of this patent

UNITED STATES PATENTS

| | | |
|---|---|---|
| 2,648,012 | Scherbatskoy | Aug. 4, 1953 |
| 2,650,309 | Webb et al. | Aug. 25, 1953 |
| 2,913,669 | Hebert | Nov. 17, 1959 |